United States Patent [19]
Good

[11] Patent Number: 6,094,958
[45] Date of Patent: Aug. 1, 2000

[54] MATERIAL-WORKING MACHINE HAVING PARALLEL PLATES HOUSING AND SUPPORTING BEAM

[76] Inventor: Bruce R. Good, 54 Tanya Ct., Plantsville, Conn. 06479

[21] Appl. No.: 09/245,250

[22] Filed: Feb. 5, 1999

[51] Int. Cl.[7] .............................. B21B 31/00; B21B 31/07
[52] U.S. Cl. ................................................ 72/237; 72/240
[58] Field of Search .............................. 72/237, 240, 245, 72/748, 250

[56] References Cited

U.S. PATENT DOCUMENTS

| | | | |
|---|---|---|---|
| 3,487,672 | 1/1970 | Sack .......................................... | 72/237 |
| 5,634,360 | 6/1997 | Tazoe et al. ............................... | 72/250 |
| 5,802,904 | 9/1998 | Minnerop et al. ......................... | 72/237 |

*Primary Examiner*—Rodney A Butler
*Attorney, Agent, or Firm*—Ira S. Dorman

[57] ABSTRACT

The housing of a metal-working machine is comprised of a pair of parallel, vertically oriented, laterally spaced, smooth-surfaced plates that define a work zone at the upper end of the housing. Components of the machine are conveniently mounted within the space between the housing plates, which plates provide square reference and guide surfaces therefor, and the machine may be of modular construction.

21 Claims, 7 Drawing Sheets

MATERIAL-WORKING MACHINE HAVING PARALLEL PLATES HOUSING AND SUPPORTING BEAM

BACKGROUND OF THE INVENTION

Conventional material-working machines, such a metal strip slitters and rolling mills, can be quite massive, and thus relatively expensive to build. Moreover, such machines often provide less than optimal levels of facility in regard to installation, set-up, and operating adjustment, and in general provide less than optimal convenience of use. These characteristics are attributable substantially to the construction of the machine main base, which is typically fabricated as a large, heavy, generally rectangular unit.

SUMMARY OF THE INVENTION

Accordingly, it is the broad object of the present invention to provide a novel material-working machine, such as a metal slitter and a metal rolling mill, having a housing that is so constructed as to reduce or eliminate certain undesirable characteristics that are present in similar conventional machines.

More specific objects are to provide such a machine wherein the construction may facilitate and reduce the cost of manufacture, while also enhancing the ease and convenience of transport, installation, set-up, adjustment, and use.

An additional specific object of the invention is to provide a machine having the foregoing features and advantages, which is of modular construction.

It has now been found that certain of the foregoing and related objects of the invention are attained by the provision of a material-working machine comprising, in combination: a housing constituting a primary support for the machine and comprised of a pair of parallel, vertically oriented plates laterally spaced from one another and defining a work zone there-between at the upper end of the housing; a plurality of spreaders, or spacers, affixed between the housing plates and maintaining the mutual lateral spacing thereof; material-working tooling disposed at the work zone and at least partially in the space between the housing plates; and drive means for the tooling, the housing normally being devoid of integral, or structural, transverse sidewalls and of an integral, or structural, top wall.

In the preferred embodiments of the machine the housing plates will be substantially identical, and at least their inwardly directed, facing surfaces will be flat and mutually parallel. The machine will advantageously include a tooling-supporting member slidably mounted for vertical-movement in the space between the housing plates, adjacent the work zone:, with the tooling-supporting member having first opposed bearing surfaces that slidably engage the facing surfaces of the housing plates, which thereby serve to guide the vertical movement of the supporting member. At least one pair of the spreaders will desirably be spaced. transversely from one another, to opposite sides of the tooling-supporting member, and will have confronting bearing surfaces thereon. Second opposed bearing surfaces on the tooling-supporting member may engage the confronting bearing surfaces on the one pair of spreaders, which will thereby serve to cooperatively guide vertical movement of the tooling-supporting member. The second opposed bearing surfaces on the one pair of spreaders, and the facing surfaces of the housing plates, will normally be mutually perpendicular, taken in horizontal planes.

The tooling-mounting means may comprise a plurality of blocks spaced transversely from one another at the work zone, at least one of which blocks may comprise one of the spreaders. The tooling will normally comprise at least two coacting components, one being mounted between two of the blocks and another being mounted on the tooling-supporting member for slidable movement therewith. Each coacting tooling component will usually comprise an arbor, the elements of which will typically be slitter blades, mill work rolls, and the like.

The machine of the invention will normally include a jacking, or screw-down mechanism, operatively attached to the housing and to a tooling-supporting member for effecting vertical movement of the latter; in certain preferred embodiments, the jacking mechanism will be disposed substantially entirely within the space between the housing plates. Added support for the machine will typically be provided by a beam assembly, including an elongate beam member to which the housing plates are rigidly attached, such as by bolting, with the beam extending either parallel or normal thereto. Pay-off and take-up coil-supporting means may be mounted on each of two opposite end portions of the beam member, and may be connected to the drive means of the machine by an endless transmission component, conveniently and safely contained within the beam member. A liquid-recovery and holding tank (e.g., for lubricating oil) may be disposed in the space between the housing plates, and the machine may additionally include an entry table and/or an exit table for guiding movement of workpiece material along a path through the work station, the table(s) advantageously being mounted against a flat, parallel outer face of one or both of the housing plates to readily afford squareness and accurate adjustability.

DETAILED DESCRIPTION OF THE PREFERRED AND ILLUSTRATED EMBODIMENTS

Turning initially to FIGS. 1 through 4 of the drawings, therein illustrated is a strip metal slitter embodying the present invention. The main housing of the machine consists, of two identical steel plates, generally designated by the numeral 10, vertically disposed in a laterally spaced parallel relationship to one another, and including a leg portion 12 which is bolted to a bottom plate 14 (which may in turn be bolted to the floor at the installation site, by means not shown). Each of the housing plates 10 is formed with a window 16 (as by flame cutting), which serves not only to provide ready access to the space between the plates 10 but also as a weight-reduction measure. The facing and outer surfaces 13, 15 of the plates, respectively, are smooth, flat, and mutually parallel, as may be achieved by Blanchard grinding or other appropriate means; generally, the edges of the plates will be machined to make them true and square, as well.

The laterally spaced relationship of the plates 10 is in part maintained by front and rear vertical spacers 17, 18, respectively, which are bolted to the plates in a transversely spaced relationship to one another. Also bolted to the plates is a horizontal main beam 20, of channel-like construction, which comprises a component of a beam assembly generally designated by the numeral 22; as will be noted, the longitudinal axis of the beam 20 extends normal to the planes of the housing plates 10. A tank 24 for the collection and containments of lubricating oil for the machines bearings is mounted in a lower position in the housing, within the space between the plates 10; an electrical panel 25 is mounted to the rear of the beam 20, and a spare (alternate size) winding mandrel 27 is stored on top (as may be slitting blades, spacers and other tooling, etc).

Also disposed between the plates 10 is a screw-down frame (so-called, despite being operative in the upward direction), generally designated by the numeral 26 and consisting of a forward piece 28, a rearward piece 30, and a top piece 32, which are welded together as an inverted, generally U-shaped assembly. The front piece 28 of the screw-down frame 26 is slotted at 39, and the pieces 28, 30 and 32 are welded to internal, medially-positioned gussets 31 and to a reinforcing plate 35. A beam 34 is attached to the top piece 32 of the frame 26, and serves to support a lower front chock 36 and a lower rear chock 38. The lower front chock 36 is disposed between a pair of chock supports 40, which are in turn secured against an upper edge 41 of the housing plates 10 by chock clamps 42, the latter being adjustably bolted against the outer surfaces 15 of the plates 10; the supports 40 cooperate with the upper edges of the plates 10 to form a way for the chock 36, which arrangement facilitates removal of the chocks and the associated tooling. The lower chocks 36, 38, contain bearings (not visible), within which a lower arbor 44 is journalled and which, in turn, supports a gang of disc blades 46.

A corresponding set of disc blades 46 are mounted upon an upper arbor 54 to cooperate with the blades on the lower arbor 44 for shearing a strip metal workpiece "W" passed between them. The opposite ends of the upper arbor 54 are journalled in a forward upper chock 48 and a rearward upper chock 50, the latter being secured in the space between the housing plates 10 and thus additionally functioning as a spreader; the upper forward chock 48 is bolted against the top edges of the chock supports 40. Laterally extending flange portions 52 of the rearward upper chock 50 rest upon the top edges of the plates 10, and may be affixed thereto within a limited range of axial positions, means (not shown) being provided in the plates 10 to effect precise fine adjustment of that position. Universal joint spindles 56 connect the arbors 44 and 54 to a drive system 58 (diagrammatically illustrated) to enable driven rotation thereof and of the blades 46 for cutting of the strip workpiece "W" in a conventional manner.

A jacking mechanism, generally designated by the numeral 60, is disposed in the space between the housing plates 10 and in substantial registry with the windows 16 thereof. The mechanism 60 is supported upon an underlying support plate 62, disengageably attached to the housing plates 10, and includes a screw 66 having a flange 64 at its upper end bolted to the top piece 32 of the screw-down frame 26. Rotation of the hand wheel 68 serves of course to advance and retract the screw 66, raising and lowering the frame 26 and thereby the lower arbor 44 and associated blades 46.

As has already been noted, the facing surfaces 13 of the housing plates 10 are flat, smooth, and parallel, thus providing true and accurate guide surfaces against which the edges 33 of the screw-down frame pieces 28, 30, 32 can bear. Similarly, the inwardly directed surfaces 37 of the spreaders 17, 18 are ground or machined to a smooth, flat condition, and thereby provide true and accurate guide surfaces against which the outer surfaces 32 of the forward and rearward pieces 28, 30 of the screw-down 26 frame can bear. As will be appreciated, the bearing surfaces on the plates 10 and spreaders 17, 18 are mutually perpendicular (taken in horizontal planes), as are the engaged surfaces of the screw-down frame 26. Although the inner surface of the rearward vertical spreader 18 is formed to cooperate with the frame 26 in the manner described, it may desirably contain biasing means, such as bronze bearing elements 39 backed by underlying thrust (i.e., Belleville) washers, which will serve to urge the frame 26 into firm engagement with the bearing surface of the forward vertical spreader 17 to eliminate axial play.

An entry guide table and an exit guide table, generally designated by the numerals 70 and 72, respectively, serve to guide passage of the strip material W from the payoff unit 71 to the winder 73 along the path through the work zone; the winder 73 is driven by the drive system 58 through appropriate power transmitting means, including the endless chain 75 enclosed in the channel beam 20 under the protective cover 77. The entry guide table 70 is attached to a jacking arrangement (only the operating wheel 74 of which is readily visible) for dynamic vertical adjustment of its position; the exit guide table 72 is also adjustable but (in this embodiment) only by manual positioning. As will be noted, the operating wheels for both of the jacking mechanisms (i.e., wheel 68 for the screw-down frame 26, and wheel 74 for the entry guide table 70) are both conveniently accessible from the front of the machine (as are other operating controls, not shown); the relatively narrow and open spacing of the housing plates 10 also greatly facilitates access (physical and visual) to other components of the system, such as for installation, removal, and adjustment of the tooling employed. Although the housing is desirably devoid of any integral, structural transverse sidewalls and top wall, it will be appreciated that suitable covers may be provided, such as a protective slitter knife guard hingedly mounted for displaceable positioning over the top of the housing.

Figure 1:
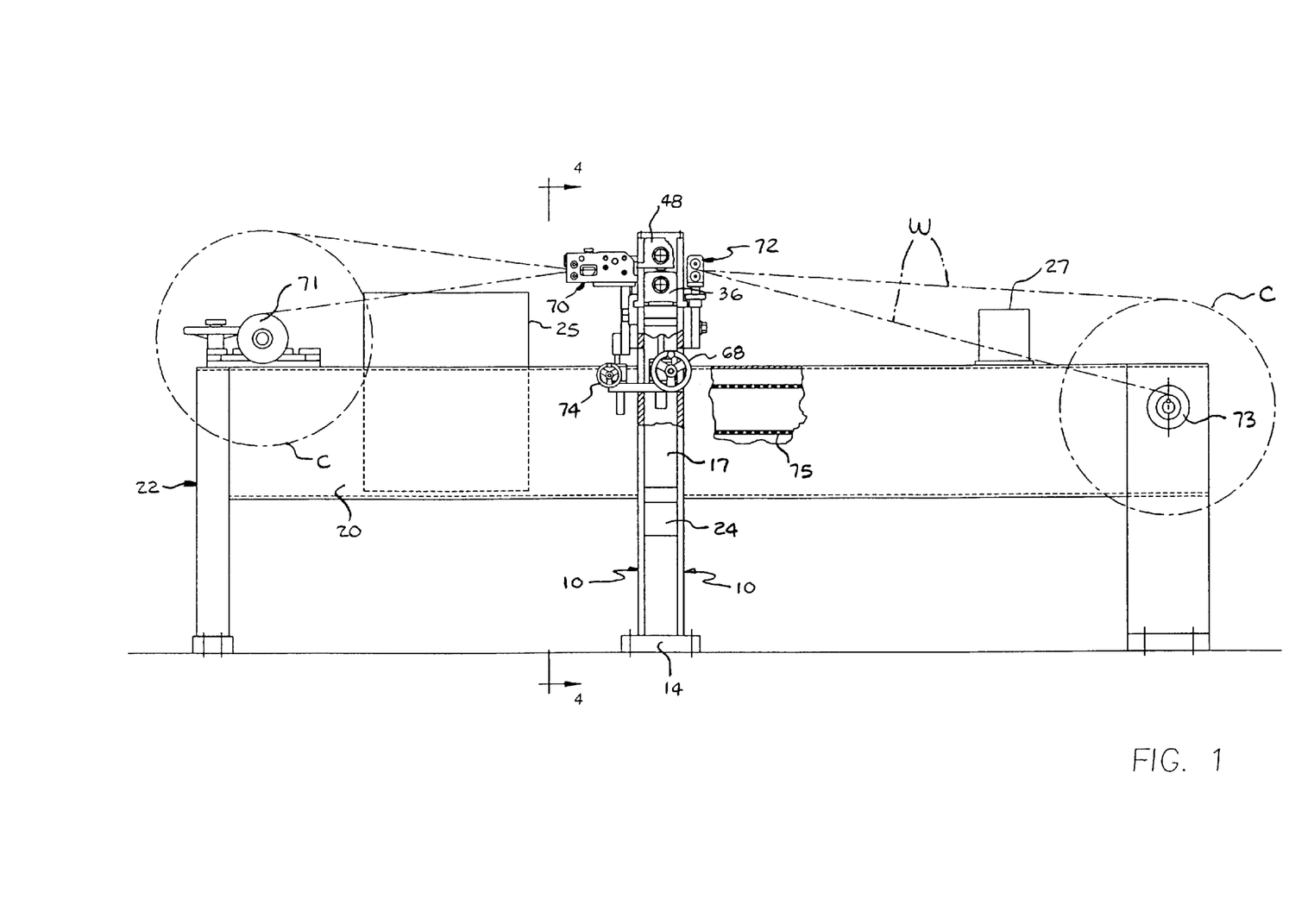
FIG. 1 is a front elevational view of a strip metal slitter embodying the present invention.
Figure 2:
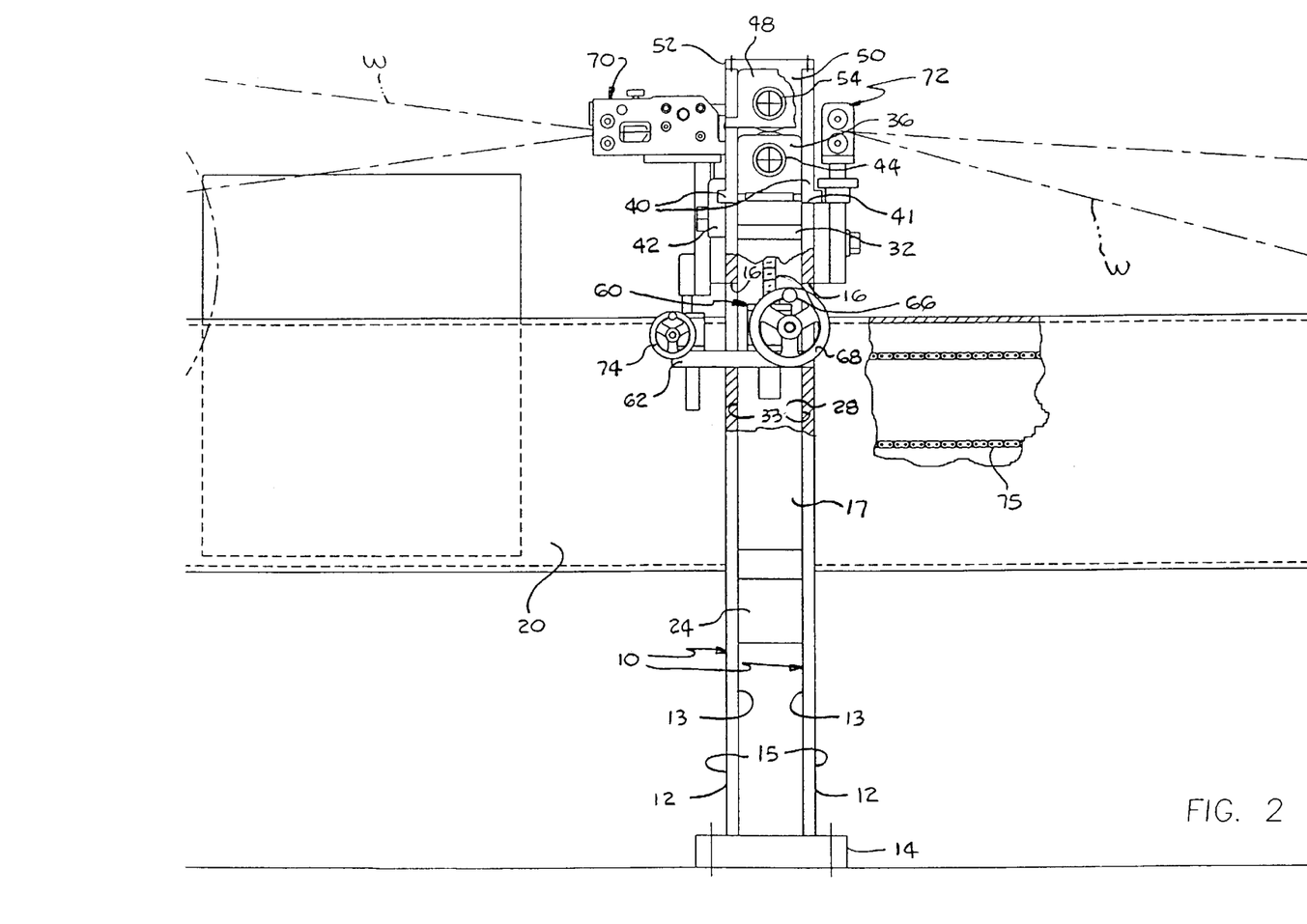
FIG. 2 is a fragmentary front elevational view of a portion of the machine of FIG. 1, drawn to an enlarged scale and having portions broken away to expose additional features.
Figure 3:
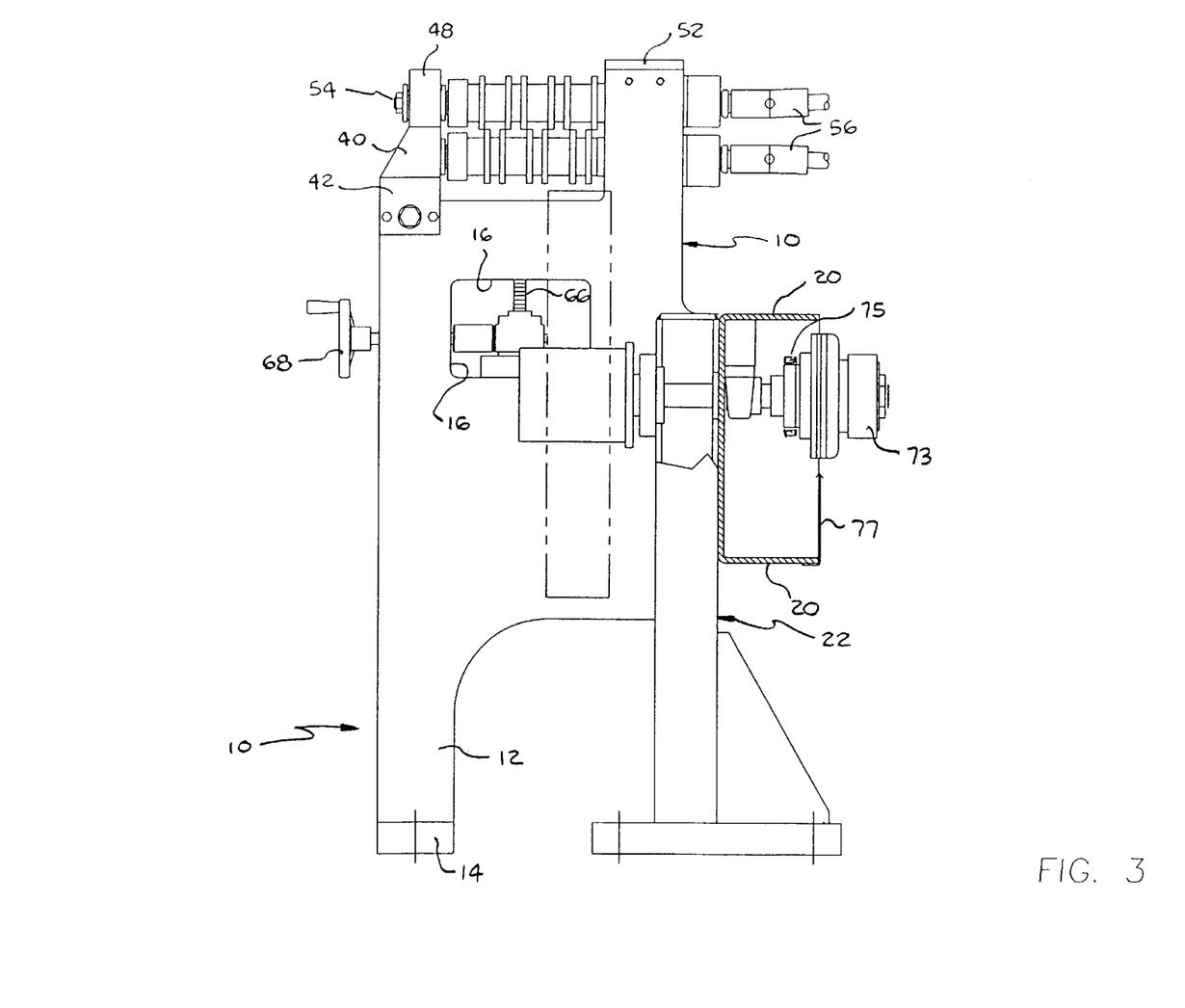
FIG. 3 is a view from the take-up end of the machine, drawn to the scale of FIG. 2.
Figure 4:
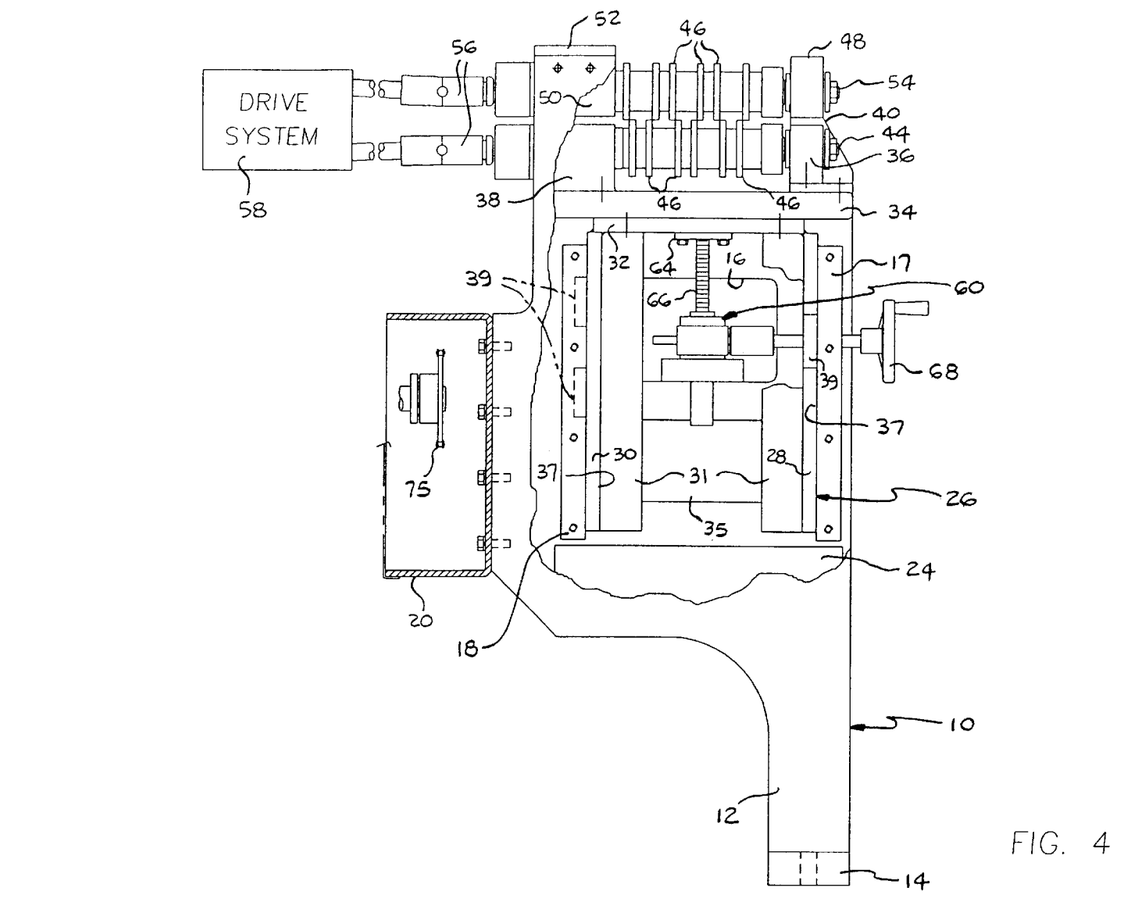
FIG. 4 is a view taken along line 4—4 of FIG. 1, drawn to the enlarged scale and having portions broken away to expose additional features.
Figure 5:
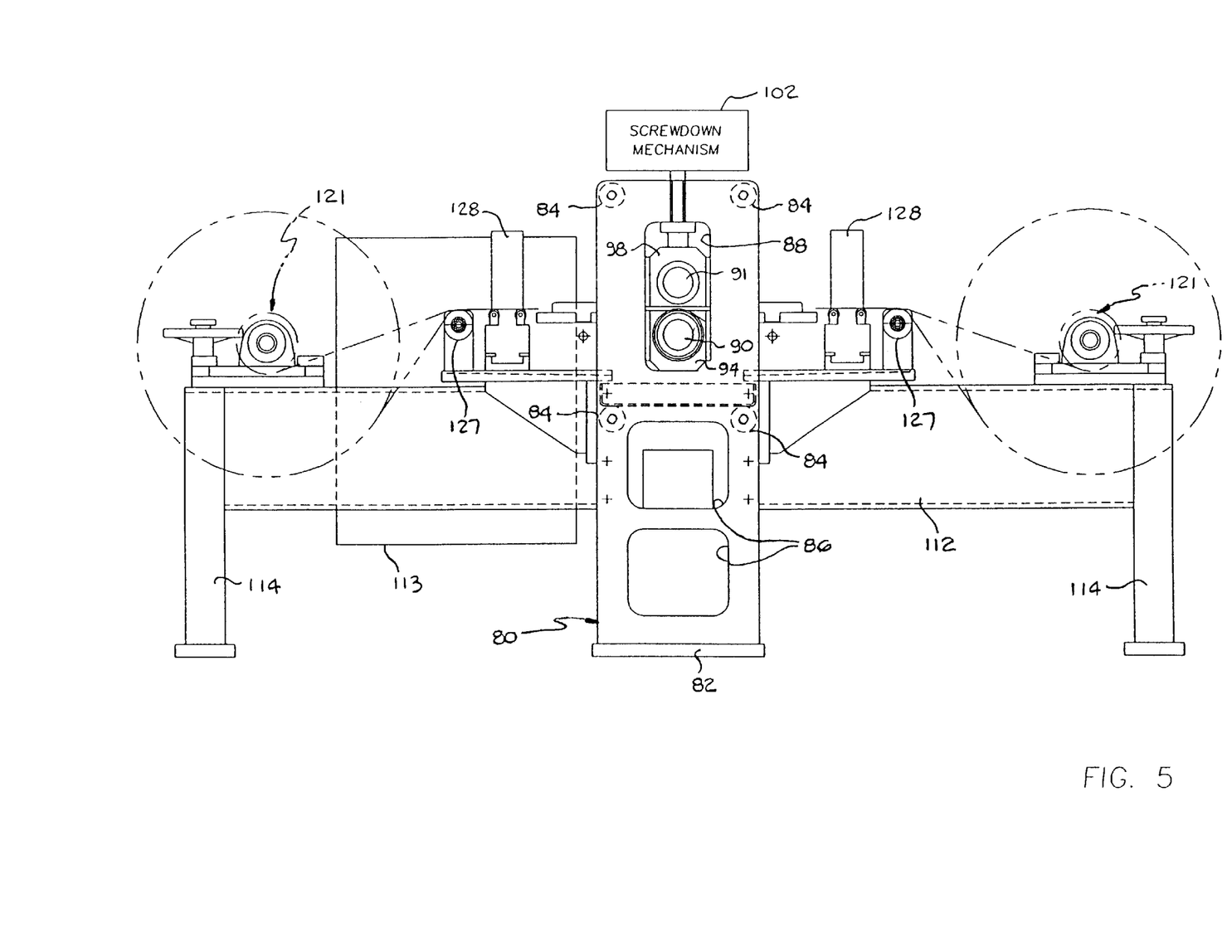
FIG. 5 is front-elevational view of a rolling mill embodying the present invention.
Figure 6:
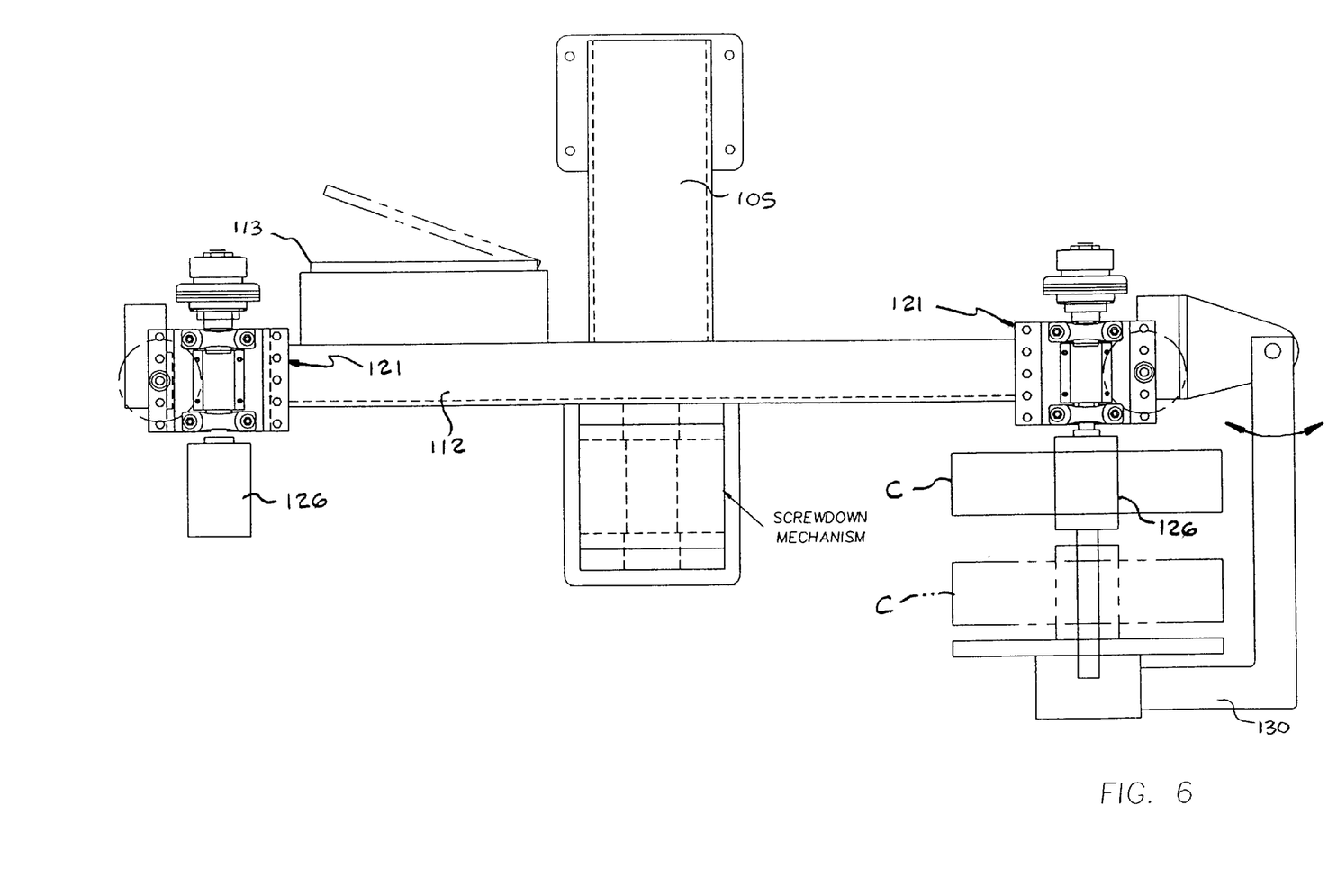
FIG. 6 is a top, somewhat diagrammatical view of the machine of FIG. 5.
Figure 7:
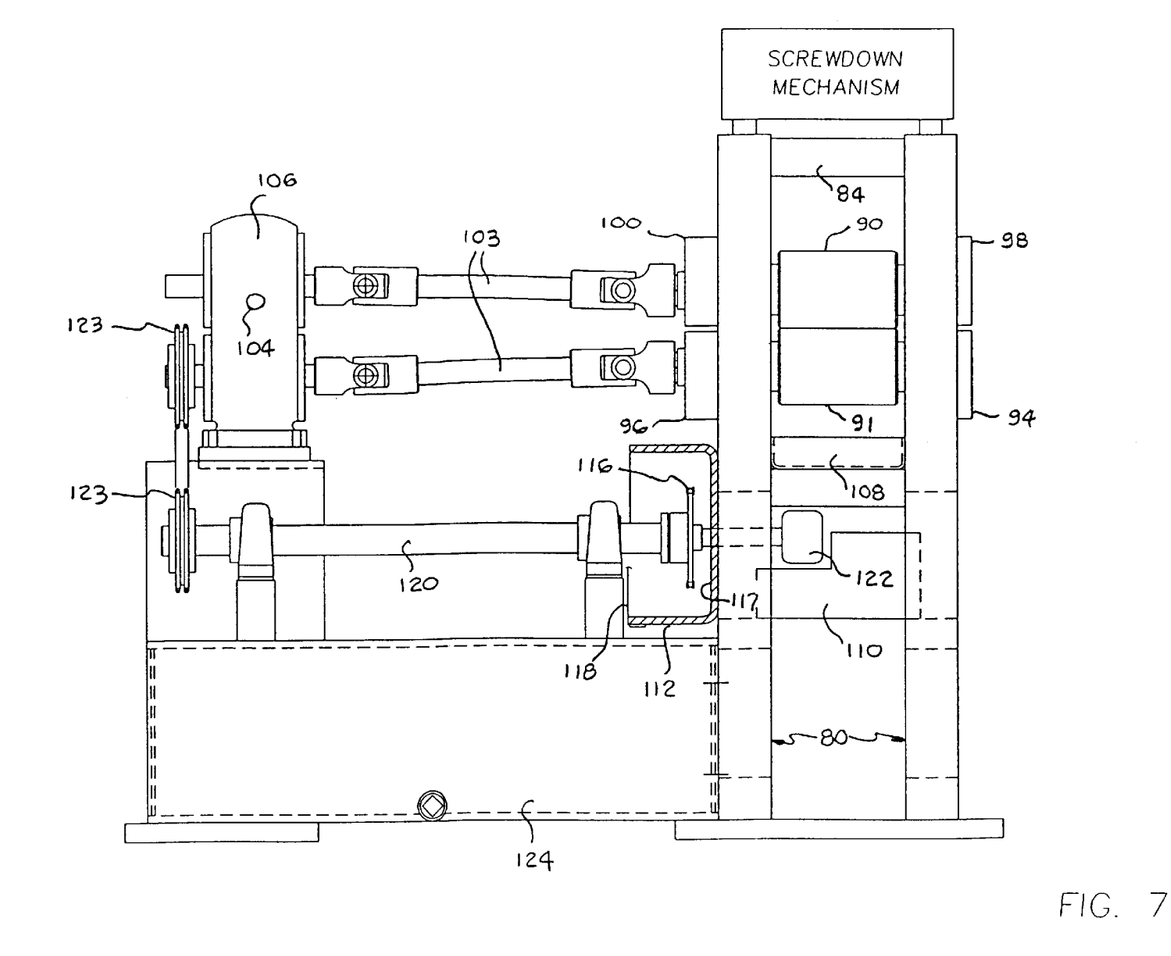
FIG. 7 is an elevational view of the machine taken from the left end, as the machine is depicted in the previous figures.

Turning now in detail to FIGS. 5 through 7 of the drawings, therein illustrated is a roll mill embodying the present invention. Once again, the housing of the machine consists of two parallel plates, generally designating by the numeral 80, which have many of the same characteristics as the plates 10 of the previous figures, including smooth, flat, mutually parallel surfaces. The plates 80 are bolted to an underlying floor plate 82, and they are maintained in parallel, laterally-spaced relationship by removable spreaders 84. Lightening windows 86 are cut in the lower portions of the plates 80, and bearing chock windows 88 are cut in the upper portions at the work zone of the machine.

A pair of mill work rolls 90, 91 are journalled in forward and rearward lower chocks 94, 96 and upper chocks 98, 100; these elements comprise the work zone. As will be appreciated, the rolls 90, 91 extend transversely within the space between the vertical housing plates 80, with the lower roll 90 being secured in a fixed vertical position and the upper roll 91 being vertically adjustable; the position of the upper roll 91 is controlled by the screw-down mechanism, shown diagrammatically and generally designated by the numeral 102. Rotation of the mill work rolls 90, 91 is effected through the connected universal joint spindles 103, driven by a motor 105 (only the shaft 104 of which can be seen in FIG. 7, but which is diagrammatically illustrated in FIG. 6), operating through a gear box 106. A coolant drip tray 108 is disposed below the work zone, partially within the space between the plates 80, as is a lube oil tank 110.

The beam assembly consists of a channel bar 112 to which the rearmost vertical plate 80 is (at the locations indicated by "+" signs) bolted; in this embodiment the beam (channel bar 112) extends parallel to the plates 80 rather than normal thereto, as in the slitter constituting the embodiment of FIGS. 1 through 4. Supports 114 are welded to the opposite ends of the bar 112, and an electrical panel 113 is mounted to the rear thereof. The jackshaft 120 delivers power to the payoff/winder mechanisms, generally designated by the numeral 121 and disengageably mounted on the opposite ends of the beam assembly, acting through endless transmission chains such as drive chain 116, which extends within the cavity 117 of the bar 112 and is protectively enclosed behind a cover 118. As will be appreciated, the jackshaft 120 receives power from the motor 105, operating through a set of pulleys 123, and it also serves to drive a pump 122 which is utilized for delivering lubrication to the bearings in which the arbors are mounted, as well as to other components. The payoff/winder mechanisms 121 are of course each capable of being driven in opposite directions, so as to enable multiple passes of the workpiece W through the working zone of the machine, passing over passline rolls 127 and through thickness gauges 128, and it will be appreciated that the two positions of the web illustrate the starting and ending diameters of the coils "C". As is seen in FIG. 6, an unloading unit 130, pivotably mounted to a vertical support of the beam assembly, may be moved to a position of axial alignment with the supporting spool of the winder 126 so as to enable facile removal of the coil of material.

Although in the embodiments described the machines are constructed for cutting and rolling of strip steel, it will be appreciated that the concepts disclosed are applicable to machines intended for working a variety of other materials (e.g., plastic and paper web, sheet, etc.). Particularly unique to the invention is the utilization of a main housing which is comprised of a pair of parallel vertical plates, which provide primary (albeit not generally the only) support for the machine. Not only does the utilization of such housing plates (which will typically be made of ¾" to 1-½" mild steel) enable the elimination of a large, heavy base of the kind that is typically used on machines of this nature, but the narrowness of the section presented by the vertical plates also greatly facilitates access to the tooling to enhance the ease and convenience of installation, setup, adjustment, removal, and use, and the openness of the system makes visual examination of the setup convenient and easy. The provision of parallel, smooth, flat surfaces on the housing plates (normally, including edge surfaces) facilitates square mounting of various components of the machine and auxiliary devices, and is especially desirable in those instances in which the components and devices are to be capable of smooth and accurate sliding movement; the identical structure of the housing plates enables their interchange to compensate for wear and to increase longevity. The modular character of the machine contributes significantly to the facility of transport and setup; i.e., not only will the main beam and the housing plates normally be assembled by bolting them together (as may of course be done on-site, and in cramped quarters), but for example the payoff and winder mechanisms, the tooling assembly, and the drive system may also be assembled with the other components by like means. Finally, the use of a rigid channel-shaped beam not only provides convenient means for mounting components (such as the electrical panel, payoff/winder units, cover elements, etc.), but it also provides a protective environment (normally opening to the rear of the machine) for conduits, wires, and the like.

Thus, it can be seen that the present invention provides a novel material-working machine that is characterized by having a housing which is so constructed as to reduce or eliminate undesirable features of similar conventional machines, and to provide or contribute to the advantages herein described.

Having thus described the invention, what is claimed is:

1. A material-working machine comprising, in combination:
    a housing constituting a primary support for said machine and comprised of a pair of parallel, vertically oriented plates laterally spaced from one another and defining a work zone therebetween at an upper end of said housing;
    a plurality of spreaders affixed between said housing plates and maintaining the mutual lateral spacing thereof;
    material-working tooling disposed at said work zone at least partially in the space between said plates;
    a structural beam assembly providing support for said machine, said beam assembly including an elongate beam member to which said housing plates are rigidly attached, and said beam member having first and second end portions that extend in opposite directions from said housing; and
    drive means for said tooling,
    said machine being constructed for working continuous-length materials stored as coils, and additionally including pay-off and take-up coil-supporting means operatively mounted on said first and second end portions of said beam member.

2. The machine of claim 1 wherein said housing plates are disengageably attached to said beam member.

3. The machine of claim 1 wherein each of said coil-supporting means is disengageably mounted on said beam member.

4. The machine of claim 1 wherein said beam member is substantially hollow along its length, wherein each of said coil supporting-means is rotatably supported, and wherein at least one of said one coil-supporting means is operatively connected to said drive means, for driven rotation-thereof, by an endless transmission component, said transmission component being contained within said beam member.

5. A material-working machine comprising, in combination:
    a housing constituting a primary support for said machine and comprised of a pair of parallel, vertically oriented plates laterally spaced from one another and defining a work zone therebetween at an upper end of said housing, said plates having inwardly directed facing surfaces that are flat and mutually parallel;
    a plurality of spreaders affixed between said housing plates and maintaining the mutual lateral spacing thereof;
    material-working tooling disposed at said work zone at least partially in the space between said plates;

a tooling-supporting member slidably mounted for vertical-movement in said space between said housing plates adjacent said work zone, said tooling-supporting member having first opposed bearing surfaces slidably engaging said facing surfaces of said housing plates, said facing surfaces thereby serving to guide such vertical movement of said supporting members; and drive means for said tooling, at least one pair of said spreaders being spaced transversely from one another to opposite sides of said tooling-supporting member, said one pair of spreaders having confronting bearing surfaces thereon and said tooling-supporting member having second opposed bearing surfaces thereon, said second opposed bearing surfaces on said tooling-supporting member engaging said confronting bearing surfaces on said one pair of spreaders, said one pair of spreaders thereby serving to cooperate with said housing plates to guide such vertical movement of said tooling-supporting member.

6. The machine of claim 5 wherein said second opposed bearing surfaces on said one pair of spreaders and said facing surfaces of said housing plates are mutually perpendicular, taken in horizontal planes.

7. A material-working machine comprising, in combination:

a housing constituting a primary support for said machine and comprised of a pair of parallel, vertically oriented plates laterally spaced from one another and defining a work zone therebetween at an upper end of said housing;

a plurality of spreaders affixed between said housing plates and maintaining the mutual lateral spacing thereof;

a plurality of mounting members;

at least one material-working tooling component mounted by said mounting members and disposed at said work zone at least partially in the space between said plates, at least one of said mounting members comprising one of said spreaders; and drive means for said at least one tooling component.

8. The machine of claim 7 wherein said plates comprising said housing are substantially identical.

9. The machine of claim 7 wherein said housing plates have inwardly directed facing surfaces that are flat and mutually parallel.

10. The machine of claim 7 wherein said housing is devoid of integral transverse sidewalls and of an integral top wall.

11. The machine of claim 7 additionally including a jacking mechanism operatively attached to said housing and said to tooling-supporting member for effecting such vertical movement of said tooling-supporting member.

12. The machine of claim 7 additionally including a structural beam assembly providing support for said machine, said beam assembly including an elongate beam member to which said housing plates are rigidly attached.

13. The machine of claim 7 additionally including a liquid-holding tank, said tank being mounted in said space between said housing plates.

14. The machine of claim 7 additionally including a tooling-supporting member slidably mounted for vertical-movement in said space between said housing plates adjacent said work zone; and at least a second tooling component, said second tooling component being mounted on said tooling-supporting member for slidable movement therewith and for coaction with said at least one tooling component.

15. The machine of claim 9 additionally including a tooling-supporting member slidably mounted for vertical-movement in said space between said housing plates adjacent said work zone, said tooling-supporting member having first opposed bearing surfaces slidably engaging said facing surfaces of said housing plates, said facing surfaces thereby serving to guide such vertical movement of said supporting member.

16. The machine of claim 9 wherein said housing plates have outwardly directed outer faces that are flat and parallel to said facing surfaces, and wherein said machine additionally includes at least one guide table for guiding movement of workpiece material along a path through said work station, said guide table being mounted against said outer face of one of said housing plates.

17. The machine of claim 5 further including tooling-mounting means comprised of a plurality of blocks spaced transversely from one another at said work zone.

18. The machine of claim 17 wherein said tooling comprises at least two coacting components, one of said tooling components being mounted between at least two of said blocks and another of said tooling components being mounted on said tooling-supporting member for slidable movement therewith.

19. The machine of claim 18 wherein said coacting tooling components comprise elements selected from the group consisting of slitter blades and mill work rolls.

20. The machine of claim 11 wherein said jacking mechanism is disposed substantially entirely within said space between said housing plates.

21. The machine of claim 12 wherein said beam member has first and second end portions that extend in opposite directions from said housing.

\* \* \* \* \*